Nov. 2, 1971  J. MANTELET  3,616,483
TWISTER TYPE SELF-WRINGING MOP
Filed April 13, 1970  6 Sheets-Sheet 2
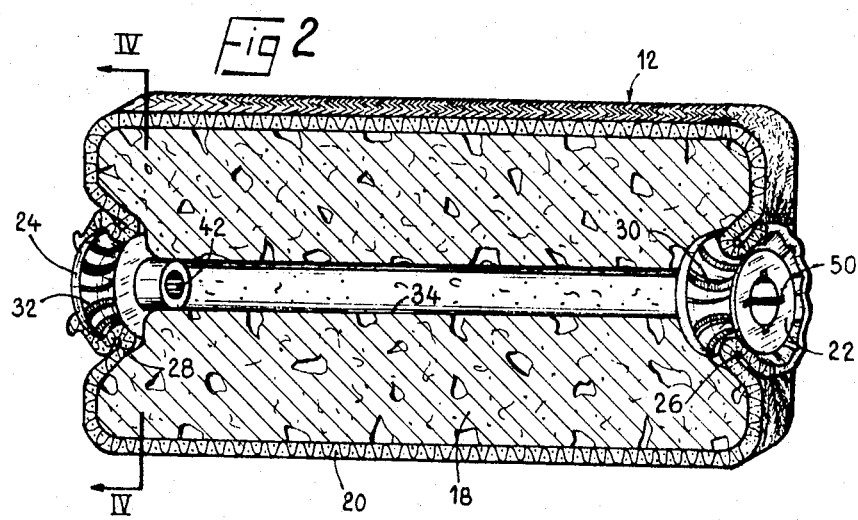
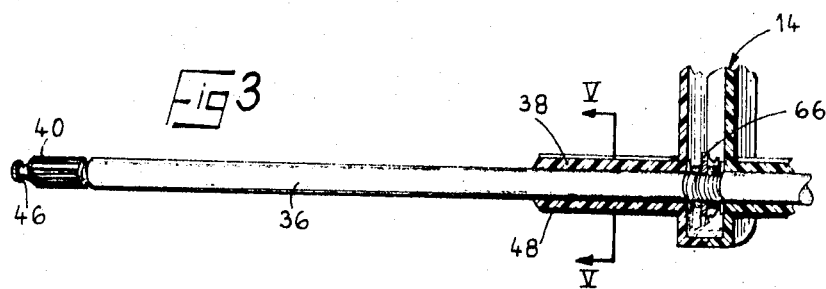
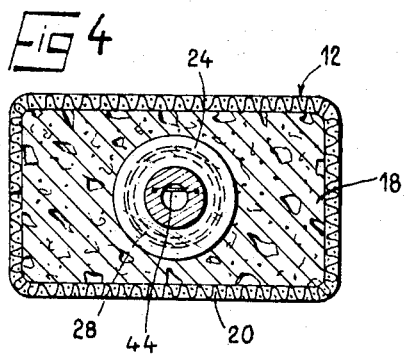
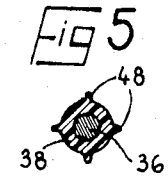
INVENTOR
JEAN MANTELET
By Young + Thompson
ATTYS.

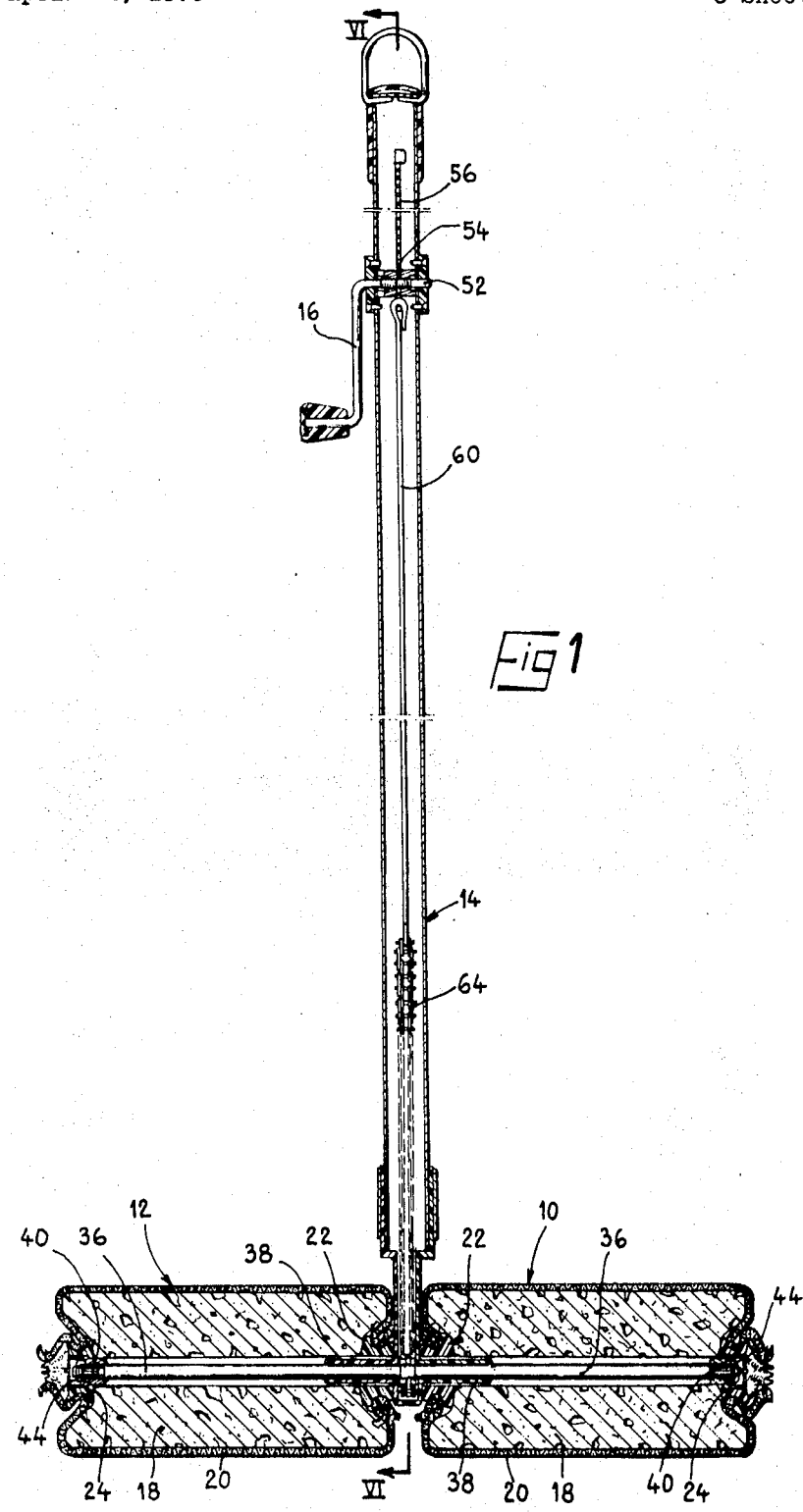

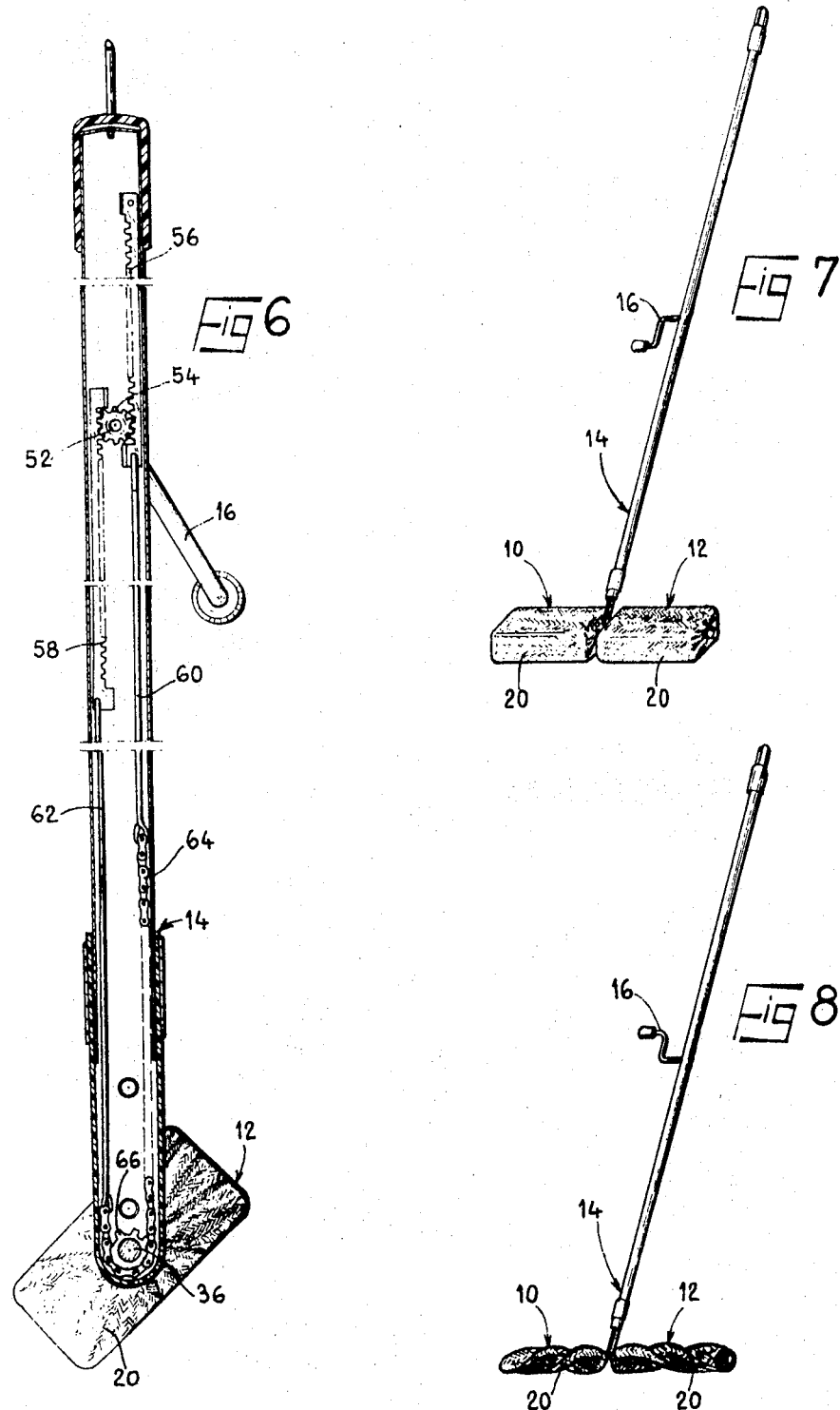

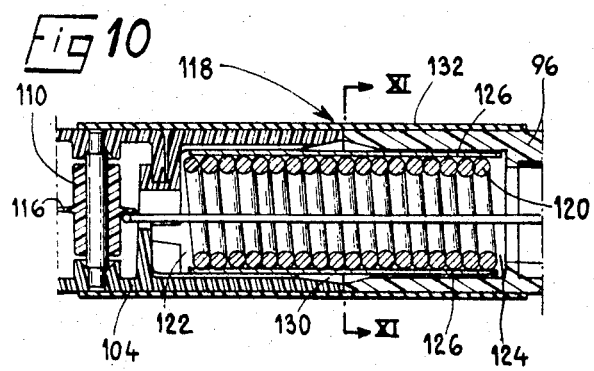
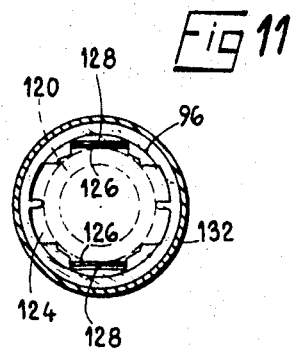
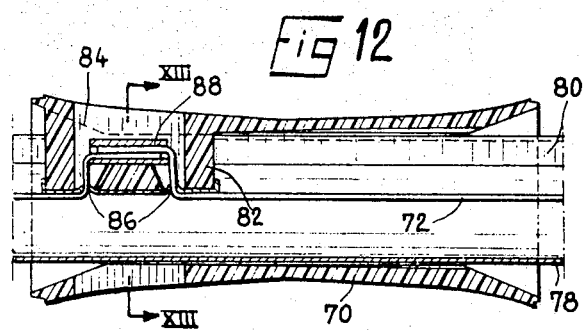
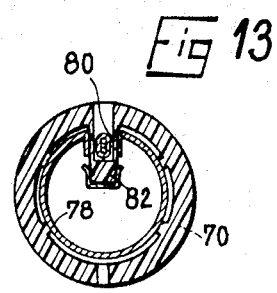
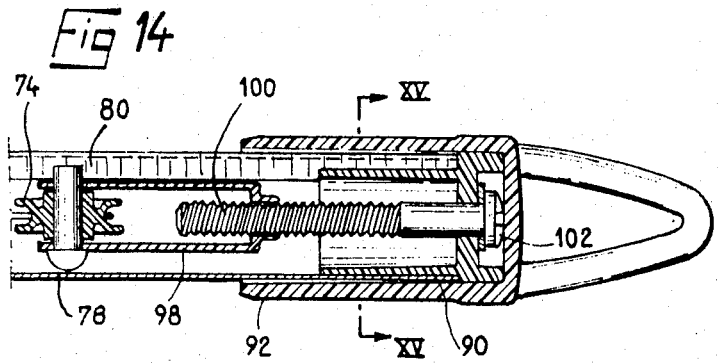
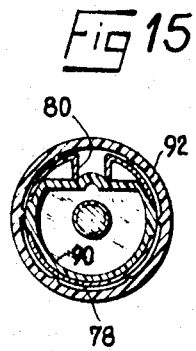

Nov. 2, 1971   J. MANTELET   3,616,483
TWISTER TYPE SELF-WRINGING MOP
Filed April 13, 1970   6 Sheets-Sheet 6
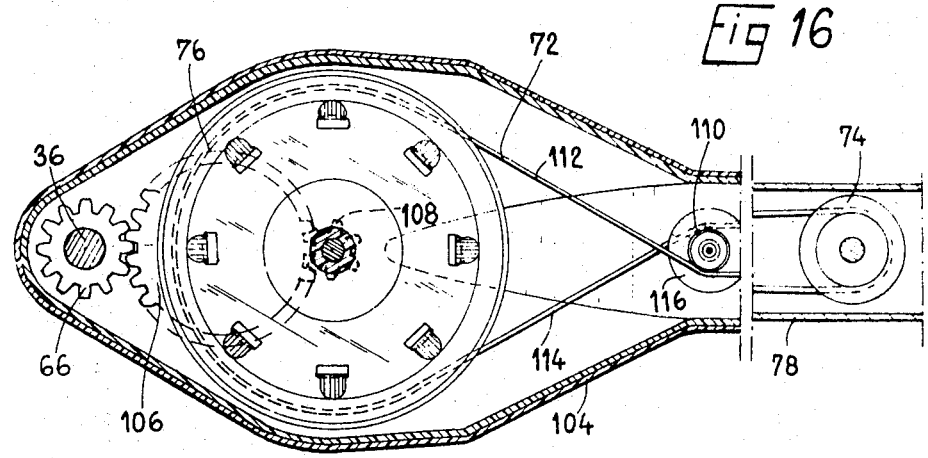
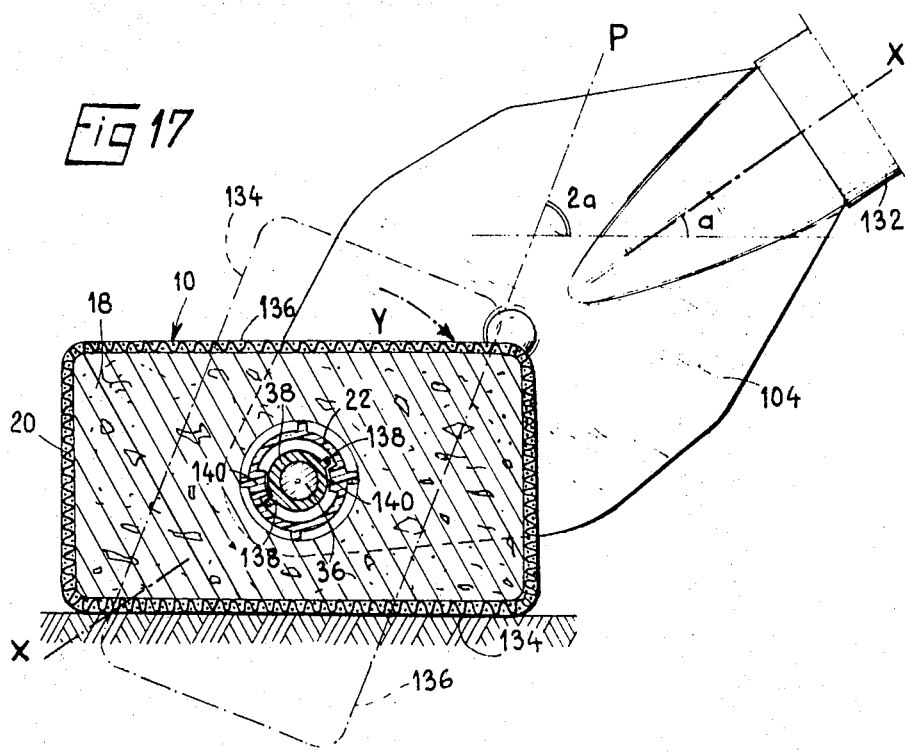
INVENTOR
JEAN MANTELET
By Young + Thompson
ATTYS.

United States Patent Office 3,616,483
Patented Nov. 2, 1971

3,616,483
TWISTER TYPE SELF-WRINGING MOP
Jean Mantelet, Paris, France, assignor to
Moulinex S.A., Bagnolet, France
Filed Apr. 13, 1970, Ser. No. 27,633
Claims priority, application France, May 8, 1969,
6914803; Feb. 13, 1970, 7005113
Int. Cl. A47l *13/142*
U.S. Cl. 15—120 A                                           20 Claims

ABSTRACT OF THE DISCLOSURE

A mop for cleaning floors and windows comprises an absorbent pad carried by a handle provided with mechanical means for expressing liquid from the pad. The pad comprises a sponge sheathed in a wrapper such as sackcloth and has secured at its opposite ends hubs one of which is rotatable relative to the other through the medium of a rod which is rotated by mechanical means associated with the handle. The second of the hubs may be partially rotatable through a predetermined angle. The relative rotation of the hubs causes twisting of the pad in a manner which simulates hand wringing.

BACKGROUND OF THE INVENTION

(1) Field of the invention

This invention relates to washing mops intended for cleaning tiles or other floor coverings, and possibly of window panes.

(2) Description of the prior art

Floor cleaning is, even now, frequently performed by housewives by means of a broom wrapped in sacking or a cloth. The housewife must then frequently remove the sacking or cloth from the broom, rinse it and squeeze it out by twisting it by hand. These operations not only soil the hands, but also necessitate frequent stooping, which renders the job particularly onerous.

To prevent these drawbacks, it has been suggested to mechanise the cloth expressing operation by means of a device for twisting or compressing the cloth, the device being actuated by means of a handle or lever arranged on the broom handle. Unfortunately, the washing mops thus formed are not satisfactory owing to the fact that the mechanical expressing of the cloth is never as intensive as that produced by direct manual torsion, and above all because the mechanical expressing devices can be adapted only for smaller cloths than those employed with "couch-grass" brushes: it follows that these cannot form an adequate reserve of liquid for appropriate floor-washing capacity, nor can they afterwards satisfactory absorb the liquid remaining on the floor.

Various types of washing mops are available on the market, comprising an absorbent pad formed by a sponge, as well as a mechanical expressing device acting by pressure on the sponge. A sponge commonly forms an appropriate reserve of liquid for the washing stage, but it also proved to be inapt to ensure as extensive a drying action on the floor as the conventional floorcloths: after a sponge has been wiped over, even if it is squeezed out properly, a layer of liquid is left on the floor which does not evaporate until after a relatively long period, whereas a conventional floorcloth leaves no more than traces of dampness behind. It may be added that the substance forming the sponge disintegrates at the end of a relatively short period of operation under the action of friction against the floor, which forces frequent replacement of the sponge.

It is a main object of the invention to produce a mop provided with an absorbent pad and with a mechanical expressing device, which does not incur the disadvantages referred to above.

SUMMARY

According to the invention, a washing mop comprises an absorbent pad carried at an end of a handle and including a cushion formed by a sponge sheathed in a permeable wrapper such as sackcloth, and a mechanical expressing device comprising coaxial hubs attached to opposite sides of the pad, and driving means operable to rotate one hub relative to the other about the common axis thereof thereby to effect torsion of the pad around said axis.

The sponge thus forms a reserve of liquid of sufficient size to allow of washing an appreciable floor surface, the mechanical device for twisting the cushion afterwards ensures appropriate expressing of the sponge-floorcloth combination, whereas during the stage of collection of liquid left on the floor, the sponge absorbs a part of the water picked up by the cloth wrapper, thus preventing the saturation of the wrapper and enabling it to ensure almost complete drying of the floor.

Moreover, the job of rubbing the floor during the washing stage is performed by the wrapper which is made of a relatively robust material, whereas the sponge is protected against any direct contact with the floor. This ensures that the absorbent pad has a long service life.

BRIEF DESCRIPTION OF THE DRAWINGS

FIG. 1 is a section of a floor mop according to the invention;

FIG. 2 is a view to an enlarged scale, partly in perspective and partly in section, of one of the two pads provided on the mop of FIG. 1;

FIG. 3 illustrates a stem for manipulation of the pad of FIG. 2;

FIG. 4 is a section of the pad along the line IV—IV, FIG. 2;

FIG. 5 is a section along the line V—V, FIG. 3;

FIG. 6 is a section of the mop along the line VI—VI, FIG. 1;

FIG. 7 is a perspective view to a reduced scale, of the mop of FIGS. 1 and 6, in the washing position;

FIG. 8 is a view similar to that of FIG. 7 illustrating the position of expressing the pads of the mop;

FIG. 10 is a longitudinal section, to an enlarged scale, of an elastic articulation embodied in the handle of the mop of FIG. 9;

FIG. 11 is a section along the line XI—XI, FIG. 10;

FIG. 12 is a longitudinal section of a sliding grip provided on the mop of FIG. 9;

FIG. 13 is a section along the line XIII—XIII, FIG. 12;

FIG. 14 is a longitudinal section of the upper end of the handle of the mop of FIG. 9;

FIG. 15 is a section along the line XV—XV of FIG. 14;

FIG. 16 illustrates, in section, a housing forming part of the mop of FIG. 9 which contains a mechanism transmitting a drive to actuating rods for the pads; and FIG. 17 is a section, to an enlarged scale, along the line XVII—XVII, FIG. 9, illustrating the mop in use.

DESCRIPTION OF THE PREFERRED EMBODIMENTS

Figure 9:
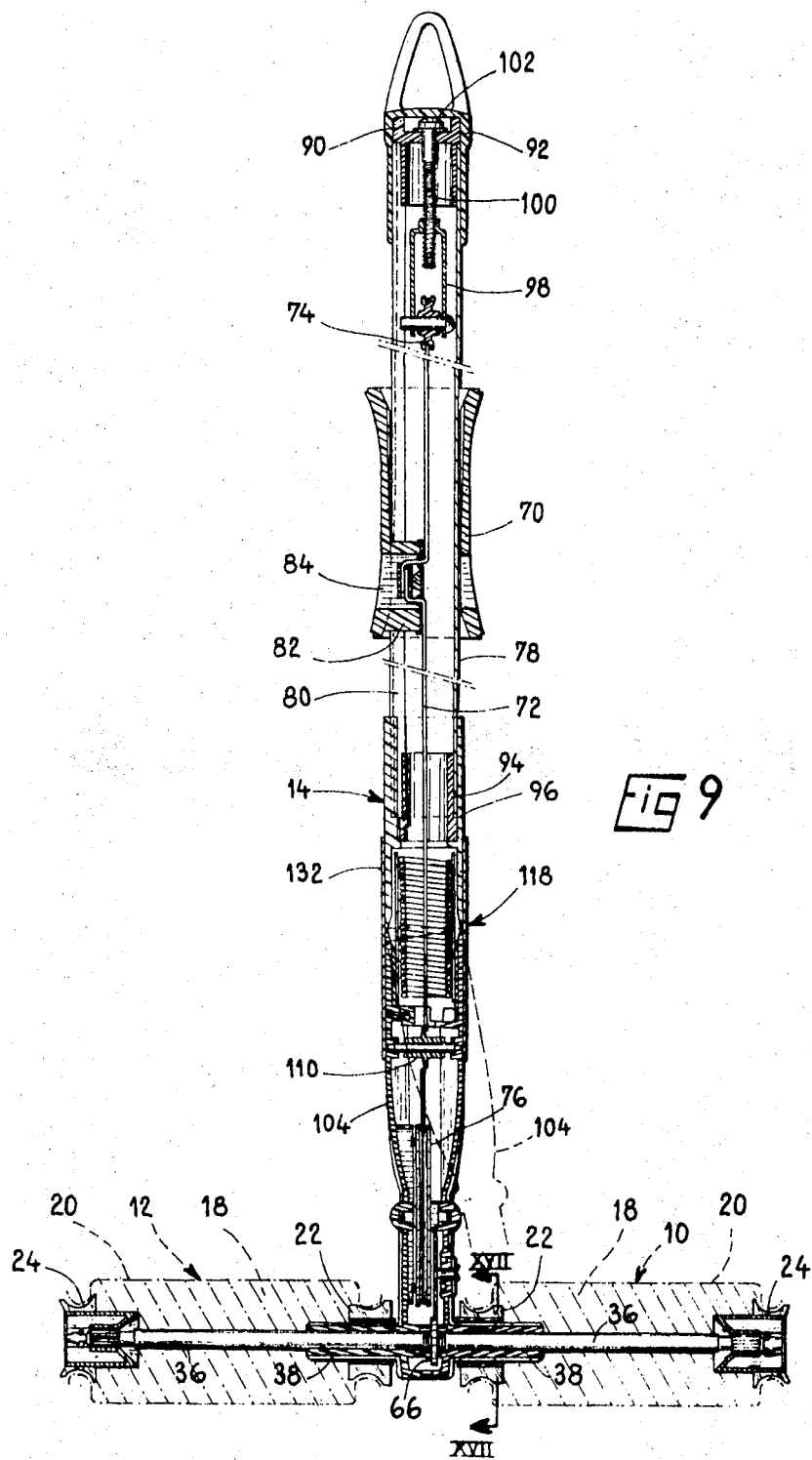
FIG. 9 is a section of a modified form of the mop.

Referring to FIGS. 1 to 8, the mop comprises two absorbent pads 10 and 12 arranged on opposite sides of the handle 14 of the mop and manipulated by means of a mechanical squeezing of expressing device actuated by means of a crank 16.

Each pad consists of a sponge 18 made of a pliable and rot-proof synthetic material, sheathed in a tubular wrapper 20 made of sacking or the like. The mechanical expressing device comprises, for each pad, two co-axial hubs 22 and 24 applied to the pad at opposite sides thereof and fastened by their peripheries to the pad, as well as driving elements, described below, which are arranged to engender, when the crank 16 is operated, rotation of the hub 24 relative to the other hub 22 about their common axis of the hubs to obtain a torsion of the pad around said axis.

As more clearly shown in FIG. 2, the hubs 22 and 24 are joined to the tubular wrapper 20 by clamping the ends of the wrapper by means of bands 26 and 28, respectively, in fluted grooves 30 and 32 of the hubs 22 and 24. The sponge 18 is provided with an axial passage 34 freely traversed by a rod 36 for driving the rotatable hub 24. The rod 36 is rotatable in an internal bearing 38, FIG. 3, within the non-rotatable hub 22 and which is unitary with the handle 14 of the mop.

Each pad 10 or 12, as illustrated in FIG. 2, is releasably arranged on the mop. To this end, the rotary hub 24 comprises an element for releasable coupling to the extremity of the rod 36, formed by a joint employing axial fins 40 on the rod 36 and splines 42 on the hub 24, with a springy pawl or catch 44, FIG. 4, engageable in a groove 46, FIG. 3, of the rod 36 to prevent the hub 24 from being displaced axially on the rod during the application of the mop. The non-rotatable hub 22 is releasably fitted on the bearing 38 by means of axial fins 48 provided on the bearing 38 and splines 50 on the hub 22 which permit axial sliding of the hub 22 on the bearing 38, whilst preventing or limiting rotation of the hub on the bearing.

The two rods 36, associated respectively with the pads 10 and 12, are unitary with each other and are conjointly rotated by the crank 16. To this end, the spindle 52, FIG. 1, of the crank 16, which is rotatable in the handle 14 of the mop, carries a pinion 54 which meshes with two racks 56 and 58, FIG. 6, arranged on opopsite sides of the pinion. The racks 56, 58 are arranged to slide axially in the sleeve or handle 14. The lower ends of the racks are connected by links 60 and 62 to the opposite ends of a chain 64 which meshes with a sprocket 66 carried by the rods 36.

During a floor-washing operation, the mop is employed in the position illustrated in FIG. 7. The sponges 18 within the pads 10 and 12 conjointly form a sufficient reserve of liquid to allow of washing an appreciable floor surface.

When it is desired to express the pads 10 and 12, the user operates the crank 16 which causes the rack 58, FIG. 6, to rise and the rack 56 to descend within the handle. This motion is accompanied by a displacement of the chain 64 and by a consequent rotation of the sprocket 66, of the rods 36 and of the rotatable hubs 24. The rotation of the hubs 24 causes twisting of the cloth wrappers 20 of the pads 10 and 12, as illustrated in FIG. 8, whilst the sponges 18 within the wrappers 20 undergo a twisting motion and one of contraction on the rods 36 on which they are impaled. During these movements, the non-rotatable hub 22 is free to be displaced axially on the bearings 38. The totality of these movements ensures a very intensive expressing action on the sponge-cloth pads, whilst accomplishing a cleaning action on the cloth owing to the fact that the dust it had collected during its passage over the floor is ejected by the violent stream of water passing out of the pads at this time.

When the crank 16 is returned to its initial position, the pads 10 and 12 return to the position thereof shown in FIG. 7. They are then clean and ready for use to collect liquid left on the floor. In this collection stage, the sponges 18 absorb the liquid as and when it is picked up by the cloth wrappers, thus preventing saturation of the cloth wrappers and enabling the mop to ensure almost complete drying of the floor.

To obtain the best results, it is of importance to make an appropriate selection of the material forming the sponge: this material should be sufficiently hydrophilic to ensure storage of a substantial quantity of water during the stage of washing as well as during the stage of drying the floor; it should also be sufficiently flexible to be squeezed out under the twisting action of the wrapper enveloping it; it should be rot-proof; and should preferably possess sufficient "bounce" to ensure adequate application of the cloth within irregularities in the floor surface. Experience has shown that some kinds of expanded polyurethane are particularly appropriate.

In the modified embodiment illustrated in FIGS. 9 to 17, the rods 36 for actuation of the pads 10 and 12 are operated by means of a grip 70 slidable lengthwise of the handle of the mop. Experience has shown that the movement necessary to effect the sliding of the grip 70 along the handle may be performed very conveniently by the housewife without particular effort or appreciable loss of time.

The grip 70 is fastened to an endless belt or cable 72 which passes around pulleys 74 and 76 within the handle 14, of which the pulley 76 transmits its motion to the rods 36. The handle 14 comprises a tube 78, FIGS. 9 and 12, provided with a longitudinal slot 80 in which slides a guiding pin 82 integral with the grip 70 and which is fastened to the belt or cable 72. The grip 70 has the form of a sleeve or sheath and is threaded over the tube 78. The pin 82 has a cavity 84 communicating with passages 86 through which the two ends of the cable 72 extend to be joined to each other by being gripped in a tubular clip 88, FIG. 12.

To provide the slotted tube 78 with the appropriate transverse stiffness, the upper extremity of the tube is tightly clamped between a plug 90 and a cap 92 (FIGS. 14 and 15), whereas its lower end is clamped in a similar manner between a bush 94 and a sheath 96, FIG. 9.

To ensure appropriate tension of the cable 72 during production of the appliance, the spindle for the upper pulley 74 is carried by a bracket 98 whose position is adjustable in the longitudinal direction of the tube 78. As shown in FIG. 14, the bracket 98 has the form of a stirrup whose arms carry the spindle of the pulley 74 and whose central portion is engaged with an axially situated adjusting screw 100; the head of the screw 100 bears on the base of the internal plug 90 and is accessible when the cap 92 is removed.

In addition to the slotted tube 78, the handle 14 comprises a case 104 housing the bottom pulley 76 as well as a gear 106 (FIG. 16) situated between the toothed hub 108 of the pulley 76 and a pinion 66 unitary with the rotatable rods 36. The bearings 38, FIG. 9, for the rods 36 are formed in one piece with the case 104. A roller 110 for guiding the belt or cable 72 is arranged between the pulleys 74 and 76, and is housed in the case 104; the two "runs" 112 and 114 of the belt or cable are crossed between the pulley 76 and the roller 110 in a manner such as to ensure effective driving of the pulley by the belt or cable; the roller 110 is provided with a central circular web 116 which has the function of ensuring appropriate spacing between the runs 112 and 114 of the belt or cable.

The slotted tube 78 is connected to the case 104 by a resilient articulation 118, FIGS. 9 and 10 allowing solely of a pivoting motion around an axis at right angles to the plane containing the axes of the handle and the rotatable rods 36. The articulation 118 comprises a coil spring 120, FIG. 10, whose turns are partly housed within a bore 122 of the case 104 and partly within the internal bore 124 of the sheath 96 which is carried by the slotted tube 78. To ensure rigidity in the direction of application of the mop on the floor, whilst allowing of the desirable lateral pivoting motion, two parallel blades 126 are interposed between the spring 120 and the internal faces of the bores of the sheath 96 and of the case 104, which faces possess longitudinal seats, FIG.

11, provided for tight reception of the blades. As shown in FIG. 10, internal chamfers are provided on the abutting ends of the sheath 96 and of the case 104 to provide a clearance space 130 in which the central areas of the blades 126 may be deflected freely during their flexing movement upon operation of the articulation 118: this makes it possible to prevent bending the blades 126 to acute angles, which could cause the blades to break. The articulation 118 is covered by a rubber sleeve 132, FIGS. 9, 10, and 11.

The presence of the articulation 118 on the handle of the map prevents any deterioration of the rotary rods 36 or of the case 104 caused by shocks unavoidably inflicted on the pads 10 and 12 during a floor-washing operation: any jolt of a pad (form example of the pad 10) in the direction of displacement of the mop is damped by lateral pivoting of the case 104 relative to the tube (broken lines of FIG. 9), the assembly formed by the pads, the rods 36, and the case 104 yielding to some extent upon meeting each obstruction.

As illustrated in FIG. 17, each of the "non-rotatable" hubs 22 can turn freely through a definite angle about its bearing 38, which provides the pad with the possibility of turning freely through an equivalent angle relative to the handle 14.

During a floor-washing operation, the housewife may produce a complete inversion of the pads by simply rotating the handle by half a turn in her hand, and then by a light thrust on the mop against the floor. This makes it possible to make alternate use of the two faces of the pad according to their degree of cleanliness, and moreover ensures a satisfactory distribution of wear over the pad, caused by friction on the floor.

To accomplish this result, the angle of deflection of the hubs 22 on the bearings 38 has an adequate value. If $a$, FIG. 17, marks the angle of inclination of the mop handle relative to the faces 134 and 136 of the pads, the turning-over of the mop through half-a-turn around the axis X—X (FIG. 17) during a washing operation, brings the face 136 of the pads into a plane P forming an angle $2a$ with the floor. If it is wished that a simple pressure of the mop on to the floor should bring the face 136 into contact with the floor by rotation of the pads according to the arrow Y, an angle of deflection of $2a$ should be freely available for the hubs 22 on their bearings 38. Since the angle $a$ is commonly comprised between thirty and sixty degrees in normal operation, it follows that the appropriate angle of deflection of the hubs 22 on the bearings 38 is comprised between sixty and one hnudred and twenty degrees. This angle of deflection may be greater, but should not exceeed one hundred and eighty degrees, since the angle $a$ is never greater than ninety degrees.

As shown in FIG. 17, the angle of deflection is determined by stops 138 and 140 borne, respectively, by the outer face of the bearing 38 and the inner face of the hub 22.

It is to be understood that modifications may be made to mop as described above, for example, the mop may be provided with a single sponge-cloth pad. To ensure the twisting of the pad, the hubs 22 and 24 may be drifted in opposite directions. Further, the cloth wrapper may be connected to the sponge locally in any desired manner and the mechanical means for twisting the wrapper may be different from those described herein and illustrated in the drawings.

I claim:

1. A washing mop comprising an absorbent pad carried at an end of a handle and including a cushion formed by a sponge sheathed in a permeable wrapper such as sackcloth, and a mechanical expressing device comprising coaxial hubs attached to opposite sides of the pad, and driving means operable to rotate one hub relative to the other about the common axis thereof thereby to effect torsion of the pad around said axis.

2. A mop according to claim 1, wherein the hubs are attached to the permeable wrapper.

3. A mop according to claim 2, wherein one of the hubs is mounted for rotation and the other for restricted rotation relative to the handle.

4. A mop according to claim 3, wherein the rotatable hub is driven by an end of a rod which freely traverses the sponge along the axis common to the hubs and which is rotatable within a bearing housed in the other of the hubs and which is unitary with the handle of the mop.

5. A mop according to claim 4, wherein to permit the pad to be released the rotatable hub comprises an element for effecting a releasable coupling with the rod, and the hub mounted for rotation is releasably fitted on said bearing.

6. A mop according to claim 5, wherein the element for coupling of the rotatable hub with the rod consists of a joint comprising axial splines and resilient means arranged to prevent axial displacement of the hub on the rod during use of the mop.

7. A mop according to claim 5, wherein the element mounted for restricted rotation is releasably fitted on the bearing by splines extending axially of the hub and bearing and permitting axial sliding movement of the hub on the bearing.

8. A mop according to claim 4, wherein the driving means comprises a crank having a spindle supported for rotation by the handle of the mop around an axis normal to the axis of the handle, a pinion rotatable with said spindle and meshing with two racks disposed on opposite sides of the pinion and which are slidable axially in the handle, and a chain meshing with a sprocket rotatable with the rod and the opposite ends of which are anchored one to each of the lower ends of said racks.

9. A mop according to claim 4, wherein the handle comprises a tube having a slot extending lengthwise thereof and the driving means comprises a grip slidable lengthwise along the handle, a pin carried by the grip for sliding movement along said slot, pulleys mounted for rotation in the handle and including one which is arranged to rotate the rod, and an endless cable connected to said pin and passing around said pulleys.

10. A mop according to claim 9, wherein the grip has the form of a sleeve threaded over the slotted tube.

11. A mop according to claim 9, wherein an upper one of the pulleys has a spindle carried by a bearer the position of which is adjustable in the longitudinal direction of the tube.

12. A mop according to claim 11, wherein the adjustable bearer comprises a stirrup the arms of which carry the spindle for the pulley and whose central portion is engaged with an adjusting screw co-axial with the tube.

13. A mop according to claim 9, wherein the handle includes a case housing the bottom pulley for the cable together with one or more gears arranged between the hub of the bottom pulley and a pinion rotatable with the rod, the rod being rotatable in a bearing carried by the case.

14. A mop according to claim 13, wherein a cable guide roller is supported in the case and is located between the upper and lower pulleys, the two runs of the cable are crossed between the lower pulley and the guide roller, and the guide roller carries a central circular web so arranged that the two runs of the cable are spaced apart.

15. A mop according to claim 13, wherein the slotted tube is connected to the case by a flexible articulation which solely allows of a pivoting motion around an axis at right angles to the plane containing axes of the handle and of the rod.

16. A mop according to claim 15, wherein the articulation comprises a coil spring housed partly in a bore formed in the case and partly in the bore of a sheath carried by the lower extremity of the slotted tube, and wherein two parallel blades are interposed between the spring and the inner faces of said bores which latter are provided with longitudinal seats arranged to receive the blades.

17. A mop according to claim 4, wherein the hub restricted in rotation is freely rotatable through a predetermined angle on the bearing unitary with the handle.

18. A mop according to claim 17, wherein the angle of rotation of the hub is between sixty and one hundred and eighty degrees.

19. A mop according to claim 17, wherein the angle of rotation is determined by stops carried respectively by the outer face of the bearing and by the inner face of the hub.

20. A mop according to claim 4, wherein two pads are arranged on opposite sides of the handle and are respectively manipulated by two rotatable rods unitary with each other.

References Cited

UNITED STATES PATENTS 2,955,309  10/1960  Brown _____ 15—119 A

FOREIGN PATENTS 592,155  2/1934  Germany _____ 15—120 A
133,903  12/1951  Sweden _____ 15—120 R DANIEL BLUM, Primary Examiner U.S. Cl. X.R.

15—144 R